United States Patent
Ishida et al.

(10) Patent No.: US 8,003,561 B2
(45) Date of Patent: Aug. 23, 2011

(54) FUEL CELL

(75) Inventors: Masayoshi Ishida, Ibaraki (JP); Shinji Hashiguchi, Osaka (JP); Yasutaka Tashiro, Osaka (JP)

(73) Assignees: Stella Chemifa Corporation, Osaka (JP); Masayoshi Ishida, Ibaraki (JP)

( * ) Notice: Subject to any disclaimer, the term of this patent is extended or adjusted under 35 U.S.C. 154(b) by 835 days.

(21) Appl. No.: 11/887,336

(22) PCT Filed: Mar. 28, 2006

(86) PCT No.: PCT/JP2006/306225
§ 371 (c)(1),
(2), (4) Date: Nov. 13, 2007

(87) PCT Pub. No.: WO2006/104123
PCT Pub. Date: Oct. 5, 2006

(65) Prior Publication Data
US 2009/0136810 A1 May 28, 2009

(30) Foreign Application Priority Data

Mar. 28, 2005 (JP) .................. 2005-092450

(51) Int. Cl.
*B01J 27/13* (2006.01)
*B01J 23/42* (2006.01)
*B01J 23/44* (2006.01)
*B01J 38/46* (2006.01)
*B01J 38/02* (2006.01)

(52) U.S. Cl. ............. 502/230; 502/36; 502/56; 502/339

(58) Field of Classification Search .................. 502/36, 502/56, 230, 339
See application file for complete search history.

(56) References Cited

U.S. PATENT DOCUMENTS

| | | | | |
|---|---|---|---|---|
| 3,134,732 A | * | 5/1964 | Kearby et al. .................. | 208/140 |
| 3,201,355 A | * | 8/1965 | Kimberlin, Jr. et al. ......... | 502/35 |
| 3,969,267 A | * | 7/1976 | McVicker ....................... | 502/36 |
| 4,032,474 A | * | 6/1977 | Goudriaan et al. ........... | 502/228 |

FOREIGN PATENT DOCUMENTS

| | | | |
|---|---|---|---|
| EP | 1867391 A1 | * | 12/2007 |
| JP | 9-219202 A | | 8/1997 |
| JP | 2002-151088 A | | 5/2002 |
| WO | 98/18717 | | 5/1998 |

OTHER PUBLICATIONS

Yoshida et al., "Tolerance to CO Poisoning on Fluorinated Pt Catalysts for the Anode of Polymer Electrolyte Fuel Cells," Electrochemistry, vol. 73, No. 4, pp. 298-300 (Apr. 5, 2005).
Bechtold E: Adsorption of fluorine on Pt (111) Appliaction of Surface Science, vol. 7, 1981, pp. 231-240, XP008089597.
Bechtold E et al.: "Adsorption of fluorine on Pt (100)" Surface Science, col. 151, 1985, pp. 521-530, XP002473118.

* cited by examiner

*Primary Examiner* — Patricia L Hailey
(74) *Attorney, Agent, or Firm* — Young & Thompson

(57) ABSTRACT

The invention aims at providing a platinum black material, without using an expensive and rare material, which is excellent in CO poisoning inhibiting effect, $H_2S$ poisoning inhibiting effect, $SO_4$ poisoning inhibiting effect and HCHO poisoning inhibiting effect, and a method for fluorinating platinum black. The platinum black material is characterized by fluorine adsorbed on its surface. The method for fluorinating platinum black is characterized by allowing platinum black to stand in a mixed gas atmosphere of n inert gas and fluorine in a low-pressure chamber to make fluorine adsorbed on the surface of the platinum black.

13 Claims, 4 Drawing Sheets

US 8,003,561 B2

FUEL CELL

TECHNICAL FIELD

The present invention relates to a platinum black material, a method for fluorinating platinum black, an electrode, a single-sided membrane electrode assembly (MEA), and a polymer electrolyte fuel cell.

BACKGROUND ART

Patent Document 1: Japanese Unexamined Patent Publication (Kokai) No. 2002-159866
Patent Document 2: Japanese Patent Gazette No. 3350691

Polymer Electrolyte Fuel Cells (PEFCs) are devices, which are capable of directly converting chemical energy into electrical energy, starting from room temperature, being downsized and lightened; and are expected to be used as new energy sources for such applications as co-generation for households and automobiles. Among the methods for supplying hydrogen, the fuel necessary for PEFCs, hydrocarbon reforming is considered to be the easiest approach considering the infrastructure development; however, the Pt catalysts on the PEFC anodes adsorb the CO in the reformed gas, or are poisoned by the gas, and are deactivated, making their practical applications difficult.

In addition, gases other than CO, such as $H_2S$, $SO_4$ and HCHO, are suspected to lower the catalyst's capabilities. As a countermeasure, Pt—Ru alloys are currently used as catalysts with a tolerance to CO poisoning (Patent document 1). However, Ru is a rare metal and is anticipated to become a huge bottleneck in the future progress of the PEFCs because of risks, such as a steep rise of its price. Therefore, one of the most important issues, in the development of PEFCs, is to develop a catalyst with a tolerance to CO poisoning, which takes the place of the Pt—Ru (Patent document 1).

As a technology for a catalyst with a tolerance to CO poisoning, a technology for surface treatment (fluorination) of a hydrogen absorbing alloy is described in Patent Document 2. The fluorination inhibits a $LaNi_5$ hydrogen absorbing alloy, which, as in the case of PEFC anodes, suffers from being deactivated by CO adsorption, from being poisoned with CO, in this case, by having fluorine adsorbed on the catalyst's surface either from a diluted fluorine gas, or from hydrogen fluoride; the fluorination inhibits the catalyst from being poisoned with CO. Because the method is featured by a capability of changing the catalyst's characteristics after the preparation of the catalyst, a capability which did not exist in the conventional catalyst preparation methods, the method is expected to provide, if brought into practice, an easy-to-use inexpensive catalyst preparation.

However, the technology described in the Patent Document 2 involves forming a film, mainly comprising a metal fluoride, on a hydrogen absorbing alloy; but metal fluorides do not necessarily inhibit other metals, or other alloys, from being poisoned with CO.
Furthermore, there is a need for a material excellent not only in a tolerance to CO poisoning, but also in tolerances to $H_2S$ poisoning, $SO_4$ poisoning and HCHO poisoning.

DISCLOSURE OF INVENTION

Problems to be Solved by the Invention

The invention aims at providing, without using an expensive and rare material such as Ru, a platinum black material excellent not only in a tolerance to CO poisoning, but also in tolerances to $H_2S$ poisoning, $SO_4$ poisoning and HCHO poisoning, and a method for fluorinating platinum black.

Means for Solving Problem

One embodiment is a platinum black material comprising a surface processed by a treatment including contact with fluorine gas or with a mixed gas of an inert gas and fluorine gas.

A further embodiment is a platinum black material comprising fluorine present on the surface in an atomic monolayer.

The surface may be pretreated to remove impurities prior to the treatment. Incidentally, the term "impurities" used herein indicates impurities such as water in gaseous or liquid form, oxygen or oxides.

A yet further embodiment is a method for fluorinating platinum black, comprising a step of allowing platinum black to stand in a fluorine gas atmosphere, or in a mixed gas atmosphere of an inert gas and fluorine, in a low-pressure chamber, and a further step of allowing the platinum black to stand in a vacuum of 1 Pa or lower in order to degasify the surface.

The fluorine concentration in the mixed gas may be 0.001% or higher.

The method may include a step of pretreating the platinum black to remove impurities present on its surface prior to the fluorination.

The fluorination may be carried out in a heating condition.

In the heating condition the heating temperature may be 20° C. or higher.

In the method, the inert gas comprises at least one of nitrogen, He and Ar.

In a further embodiment, the platinum black material treated by the above-described method.

The platinum black material has excellent tolerances to CO poisoning, $H_2S$ poisoning, $SO_4$ poisoning and HCHO poisoning.

A yet further embodiment is an electrode comprising the above-described platinum black material.

A still further embodiment is a single-sided membrane electrode assembly comprising the just-noted electrode supported on one side of the assembly.

Another embodiment is a polymer electrolyte fuel cell comprising the just-noted single-sided membrane electrode assembly.

Effect of the Invention

The following effects are achieved by the platinum black according to the present invention. Expensive and rare materials are not required.

Excellent CO poisoning inhibiting effect is expected. And excellent $H_2S$ poisoning inhibiting effect, $SO_4$ poisoning inhibiting effect and HCHO poisoning inhibiting effect are also expected. The invention is used suitably for a PEFC anode.

BEST MODE FOR CARRYING OUT THE INVENTION

Figure 1:
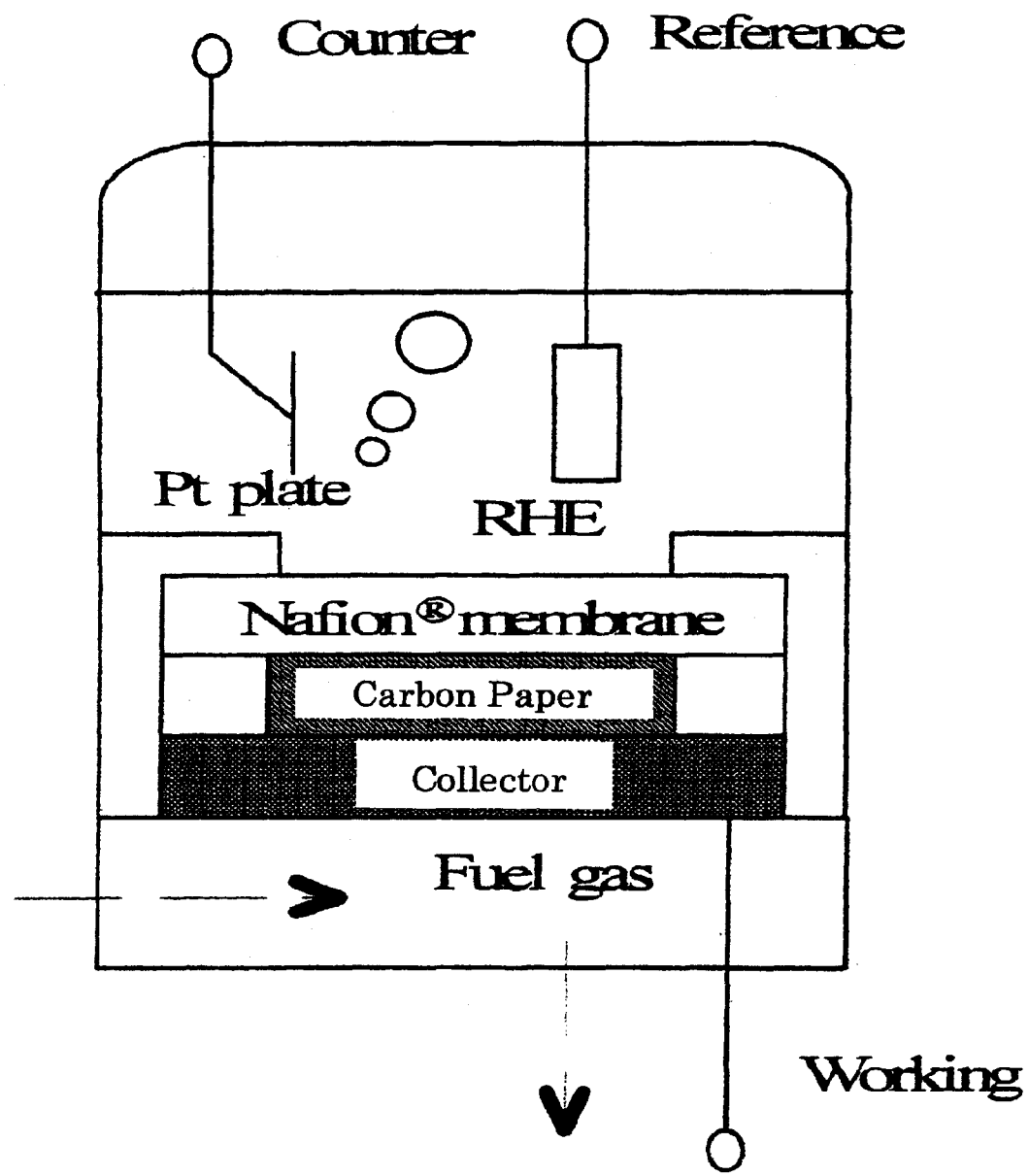
FIG. 1 is a diagram showing the structural concept of a PEFC half-cell.

According to the present invention, fluorine is adsorbed on the surface of platinum black by allowing the platinum black to stand in a mixed gas atmosphere of an inert gas and fluorine in a low-pressure chamber.

(Starting Material: Platinum Black)
Any existing platinum black may be used as the starting material. For example, platinum black manufactured by TANAKA KIKINZOKU may be used.

(Low-Pressure Chamber/Pretreatment)
Preferably, impurities are removed from the surface of the platinum black before fluorination.

The impurities include, for example, water in gaseous or liquid form, oxygen or oxides. Water in gaseous or liquid form or oxygen may be removed by allowing platinum black to stand in a low-pressure chamber. It is also effective to flow a purge gas.

The degasification is carried out more effectively by treating with heat in addition to reduced pressure in the low-pressure chamber. Replacing the inert gas several times is also effective.

After placing platinum black in a low-pressure chamber, the pressure inside the chamber is reduced. The vacuum is preferably 1 Pa or lower. This further reduces the adsorbed gas and facilitates the treatment.

In addition, it is preferable to lower the impurity concentrations (especially water concentration) in the low-pressure chamber as much as possible at the time of the pretreatment to remove the impurities present on the surface. Preferably, the concentration is 100 ppt or lower and, more preferably, 10 ppb or lower.

Oxide impurities may be removed by dissolving them in hydrofluoric acid and separating them by filtration. After the removal, it is preferable to fluorinate without exposing to atmosphere.

(Fluorination)
The fluorination, according to the present invention, is carried out by introducing a fluorine containing gas into a low-pressure chamber. The fluorination is a treatment to induce fluorine adsorption on the surface of platinum black.

Although depending on temperature and pressure, the concentration of fluorine preferably, is from 0.001 to 10% and, more preferably, from 0.01 to 1%, in order to induce fluorine adsorption.

A fluorine concentration in the above range results in the adsorption of fluorine without the formation of fluoride films.

An elevated temperature is preferable for the temperature of fluorination. In particular, the temperature, preferably, is from 0 to 300° C. and, more preferably, from 30 to 250° C. This may be carried out by heating the gas.

(Posttreatment)
The following posttreatment is preferably performed after the fluorination described above.

The posttreatment is a treatment to remove excessive fluorine from the surface. In particular, it is a treatment of degasifying the surface. The surface is degasified so that an atomic monolayer of fluorine remains on the surface. This prevents excessive fluorine from decomposing and affecting the surface later.

The degasification for leaving an atomic monolayer of fluorine mainly involves controlling the surface temperature, vacuum and degasification treatment time. For example, the fluorine layer on the surface is desorbed by allowing the surface to stand in a vacuum of 1 Pa or lower for 1 hour. However, the fluorine (atomic monolayer) adhered directly to or adsorbed on the platinum black surface is not removed by the treatment of allowing the surface to stand in the low-pressure chamber under the prescribed pressure for the prescribed period of time. The surface may be kept in the low-pressure chamber for 1 hour or longer. In particular, the conditions for the atomic monolayer remaining may be predetermined through actual experiments, in which platinum black is treated for fluorination under varying surface temperature, vacuum, and degasification time.

(Fluorine Adsorbed Platinum Black)
Fluorine is adsorbed on the surface of platinum black by the fluorination treatment described above. Fluorine should be adsorbed without forming platinum fluoride and, preferably, adsorbed to form an atomic monolayer.

Example 1

An experiment was carried out using platinum black manufactured by TANAKA KIKINZOKU.

(Pretreatment)
A pretreatment was carried out under the following conditions.

The treatment was carried out by repeatedly introducing and evacuating $N_2$ to and from a chamber under a reduced pressure for several times and subsequently introducing $N_2$ at 100° C. for 2 hours.

(Fluorination)
The pretreated platinum black was placed in the chamber evacuated to a vacuum pressure of 1 Pa or lower, and fluorine was adsorbed by allowing the platinum black to stand in a mixed gas of $N_2$ and $F_2$ with adjusted volume concentration of fluorine for 3 hours.

The weight difference was measured at this time to confirm fluorine adsorption on the platinum black. The mixed-gas temperature was raised to 250° C. to perform the fluorination.

(Posttreatment)
After the fluorination, the chamber was evacuated to 1 Pa or lower and held at the pressure for 1 hour to remove fluorine adsorbed excessively, and the sample was retrieved quickly under $N_2$ atmosphere.

The catalyst sample thus prepared was mixed with 5 wt % Nafion® solution and pure water to form a catalyst ink, which then was supported on a carbon paper (TGP-H-090 manufactured by Toray) of $\phi$=10.0 mm with 300 μg/cm². After drying at room temperature, the above was joined to a Nafion 115 (manufactured by Dupont) membrane by hot pressing at 135° C. for 3 minutes to form a single-sided MEA.

A gas passage was made on the MEA holder to allow supply of gas to the diffusion layer of the single-sided MEA thus prepared, which was put in contact with a collector or a working electrode to configure a half-cell as shown in FIG. 1.

The reference electrode was an RHE and the counter electrode was a platinum plate. The electrolyte was 1M perchloric acid, which was heated to 50° C. using an immersion heater, to reproduce PEFC operating conditions as much as possible. When hydrogen oxidation occurs on the working electrode, hydrogen is generated on the counter electrode, which may disturb the reaction at the counter electrode and, in order to trap this, Ar gas was introduced in bubbles into the solution.

Ar gas was first introduced into the diffusion layer of the single-sided MEA and cyclic voltammogram (CV) was measured at an electric potential of 50 to 1500 mVvsRHE and sweep rate of 100 mV/S. Then, the cleaning of the electrode surface and the background measurement were performed. Subsequently, a hydrogen gases containing 0 ppm, 50 ppm, and 100 ppm of CO were introduced, 50 mVvsRHE was applied for 40 min in the mixed gas to stabilize the CO adsorption on the electrode, and hydrogen oxidation current was measured within the electric potential range of 50 to 300 VvsRHE at the sweep rate of 0.5 mV/S to measure the effect of CO on the hydrogen oxidation.

(Fluorinated Pt Black Catalyst)

Figure 2:
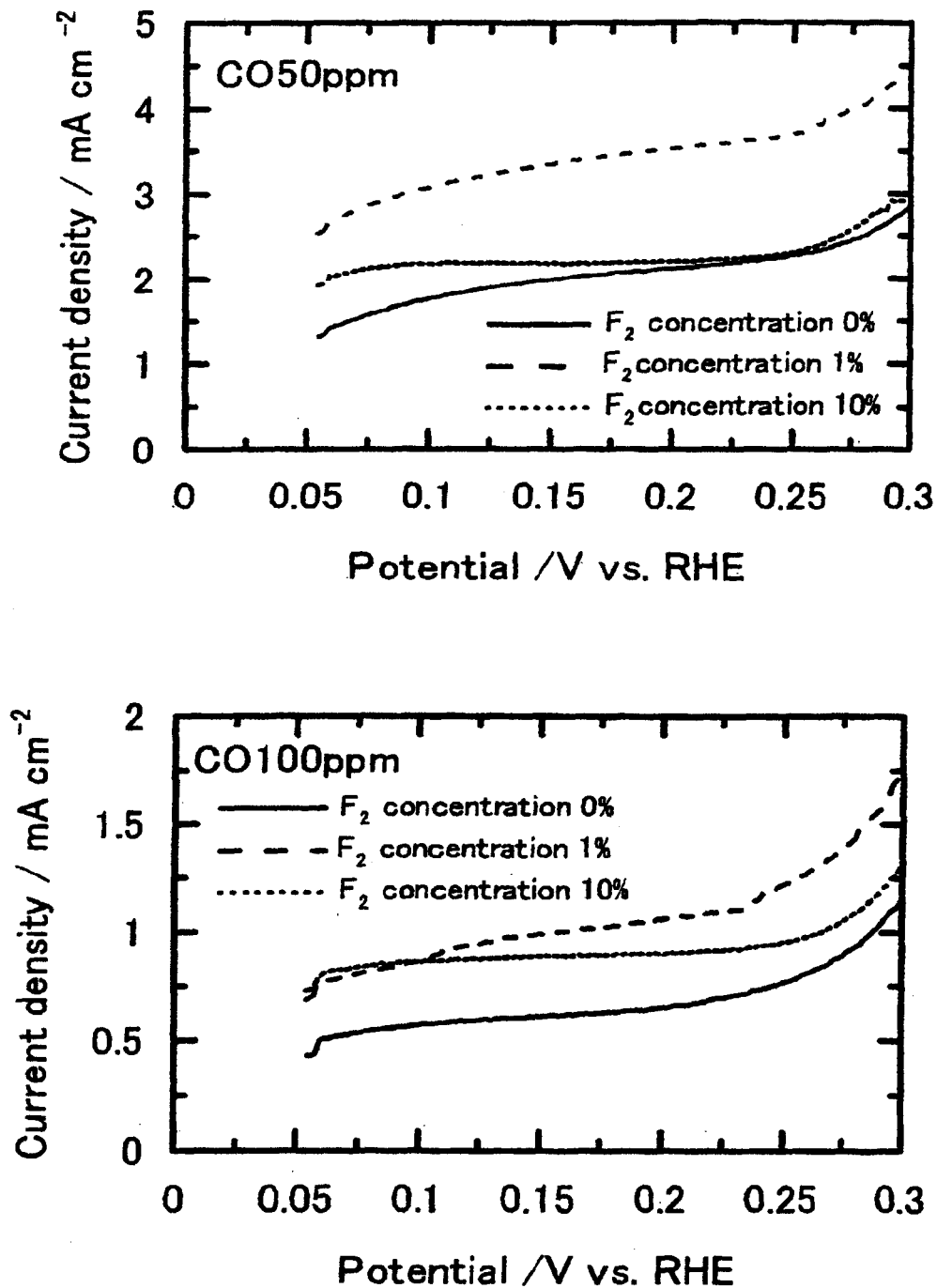
FIG. 2 is a graph, in association with an embodiment, showing hydrogen oxidation current in hydrogen gas containing CO.

FIG. 2 shows the result of comparison of the hydrogen oxidation current, measured in a hydrogen gas containing 100 ppm of CO, for Pt black electrodes fluorinated in different manners. The results indicate that the Pt black electrodes, fluorinated with 1% and 10% concentration, exhibit currents higher than the untreated one for both the CO concentrations of 50 ppm and 100 ppm with the one treated with 1% exhibiting more enhanced effect.

On the other hand, the hydrogen oxidation current of the sample treated with 10% fluorine concentration declines to 70.2% of the untreated platinum black in pure hydrogen atmosphere, indicating that the hydrogen oxidation is disturbed, along with the reduction in the surface area of wave of hydrogen in Ar atmosphere. (Table 1)

TABLE 1

Comparison of H2 oxidation current for fluorinated Pt black catalyst in this study

| $F_2$ (concentration) | $H_2$ Oxidation Current Current density/mAcm$^{-2a)}$ | True surface area/ Apparent surface area (cm$^2$/cm$^2$) |
|---|---|---|
| 0% | 470 | 68.9 |
| 1% | 469 | 69.5 |
| 10% | 349 | 14.2 |

$^{a)}$200 mV vs. RHE

Figure 3:
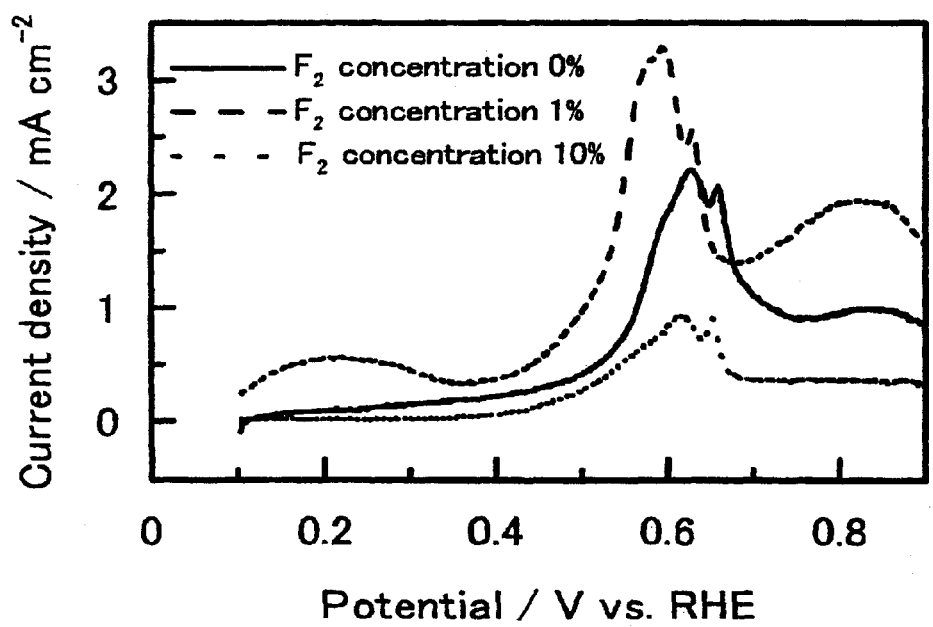
FIG. 3 is a graph, in association with an embodiment, showing the CV measured after the measurement of hydrogen oxidation current, with atmosphere replaced by Ar, at a sweep rate of 10 mV/S.

After the hydrogen oxidation current was measured at CO concentration of 100 ppm, the atmosphere was replaced by Ar and CVs were measured at a sweep rate of 10 mV/S: it was indicated that both the untreated Pt black and the Pt black fluorinated by 10% concentration did not exhibit any region of wave of hydrogen as a result from CO poisoning; however, the Pt black fluorinated by 1% concentration exhibited the region of wave of hydrogen: and the results show that the Pt black fluorinated by 1% concentration has CO poisoning inhibiting effect. (FIG. 3)

Figure 4:
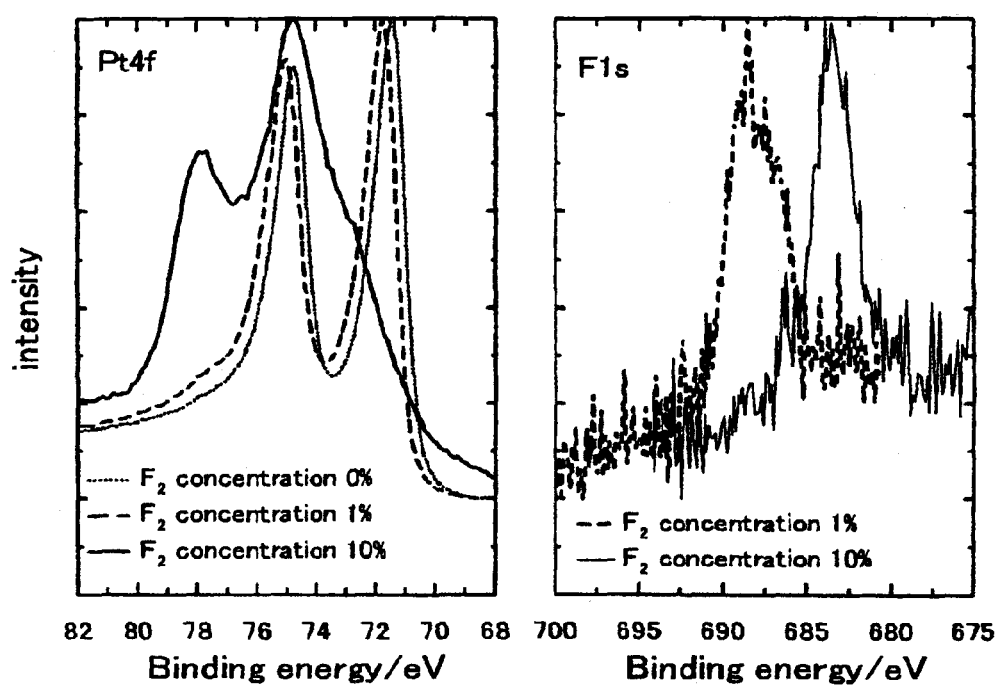
FIG. 4 is a graph, in association with an embodiment, showing the XPS measurement result of each sample.

FIG. 4 shows the results of XPS measurements on each sample. Almost no shift was observed in the Pt4f wave form of the Pt black treated with 1% concentration, while a remarkable shift was observed in the Pt4f wave form of the Pt black treated with 10% concentration, along with its F1s peak shifted toward the lower energy side compared to the Pt black treated with 1% concentration. The study by E. Bechtold et al., in which fluorine was adsorbed onto the surface of a Pt single crystal in a high vacuum, reported that fluorine is present in the form of a monolayer adsorbed on the surface of the Pt when a small amount of fluorine was adsorbed, while fluorine is present in the form of a Pt fluoride, PtF$_4$, when a large amount of fluorine was adsorbed. Assuming that the same phenomena occur on Pt polycrystal surfaces, the difference, in electrochemical behavior between different fluorine concentrations, is conjectured that fluorine is adsorbed as a monolayer onto Pt in the case of 1% fluorine concentration, while PtF$_4$ is formed in the case of 10% fluorine concentration.

One mechanism among others, has been proposed for hydrogen absorbing alloys, that fluorides such as LaF$_3$ formed on its surface inhibits adsorption of impurities such as CO. On the other hand, in the case of Pt catalysts, it was shown that the formation of a fluoride inhibits hydrogen oxidation. The inhibition is considered to be due to the fact that, unlike hydrogen absorbing alloys, the reactions on the anode Pt catalysts require the formation of three-phase interfaces, in which effective surface area for Pt activation is reduced by the formation of the fluoride.

The result exhibited a remarkable effect in the case that the fluorine concentration for fluorination was 1%, while hydrogen oxidation was inhibited in the case that the fluorine concentration was 10%. This is considered to be due to the fact that fluorine may exist on the surface of platinum in two different forms, i.e., fluorine monolayer adsorption and platinum fluoride.

The tolerances to H$_2$S poisoning, SO$_4$ poisoning and HCHO poisoning were also measured. The results showed that all the tolerances were superior.

INDUSTRIAL APPLICABILITY

The platinum black according to the present invention is excellent in CO poisoning inhibiting effect, H$_2$S poisoning inhibiting effect, SO$_4$ poisoning inhibiting effect and HCHO poisoning inhibiting effect, and is suitable for use with electrodes and, in particular, the electrodes for fuel cells.

The fuel cell according to the present invention may use the CO containing hydrogen gas, obtained from hydrocarbon reformation, as its fuel gas.

As a result, supply of fuel is made possible without further infrastructure development and is used as energy sources for, especially, automobiles and co-generation for house hold.

The invention claimed is:

1. A method for fluorinating platinum black, comprising a step of allowing platinum black to stand in a fluorine gas atmosphere, or in a mixed gas atmosphere of an inert gas and fluorine, in a low-pressure chamber and a further step of evacuating the chamber to a vacuum of 1 Pa or lower and allowing the platinum black to stand in the vacuum in order to degasify a surface thereof.

2. The method for fluorinating platinum black according to claim 1, wherein the fluorine concentration in the mixed gas is 0.001% by volume or higher.

3. The method for fluorinating platinum black according to claim 2, further comprising a step of pretreating the platinum black to remove impurities present on its surface prior to the fluorination.

4. The method for fluorinating platinum black according to claim 3, wherein the fluorination is carried out in a heating condition.

5. The method for fluorinating platinum black according to claim 3, wherein the inert gas comprises at least one of nitrogen, He and Ar.

6. The method for fluorinating platinum black according to claim 2, wherein the fluorination is carried out in a heating condition.

7. The method for fluorinating platinum black according to claim 2, wherein the inert gas comprises at least one of nitrogen, He and Ar.

8. The method for fluorinating platinum black according to claim 1, wherein the fluorination is carried out in a heating condition.

9. The method for fluorinating platinum black according to claim 8, wherein the heating temperature is 20° C. or higher.

10. The method for fluorinating platinum black according to claim 9, wherein the inert gas comprises at least one of nitrogen, He and Ar.

11. The method for fluorinating platinum black according to claim 8, wherein the inert gas comprises at least one of nitrogen, He and Ar.

12. The method for fluorinating platinum black according to claim 1, wherein the inert gas comprises at least one of nitrogen, He and Ar.

13. The method for fluorinating platinum black according to claim 1, wherein the platinum black stands in the vacuum in order to degasify a surface thereof for at least one hour.

* * * * *